Figure 1:
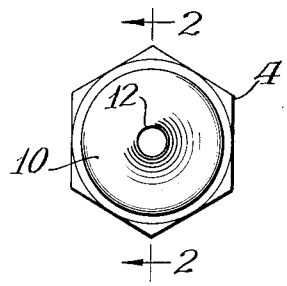

Feb. 15, 1949. J. E. JOHANSON ET AL 2,462,023
SEAL NUT
Filed Nov. 2, 1945 2 Sheets-Sheet 1

Inventors:
John E. Johanson
William A. Yonkers
By Wm. F. Freudenreich,
Attorney

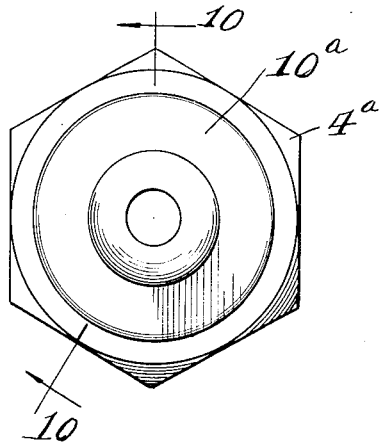
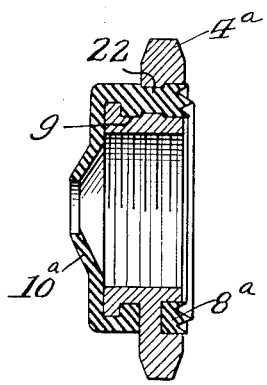
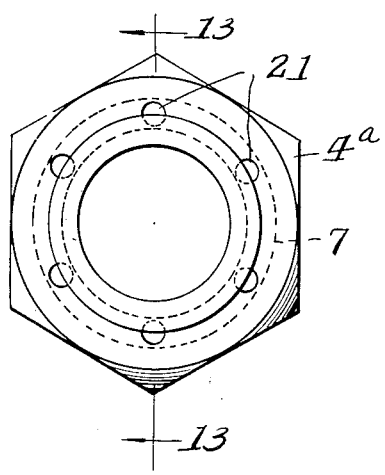
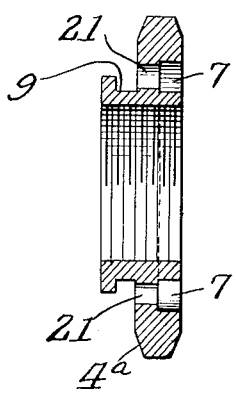
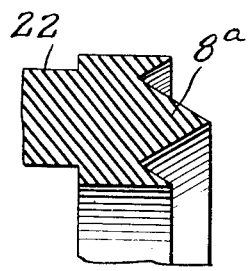

Patented Feb. 15, 1949

2,462,023

UNITED STATES PATENT OFFICE 2,462,023

SEAL NUT

John E. Johanson, Boonton, and William A. Yonkers, Montville, N. J., assignors to Radio Frequency Laboratories, Inc., a corporation of New Jersey Application November 2, 1945, Serial No. 626,243

5 Claims. (Cl. 286—29)

There are many situations in which a nut is screwed on a nipple or the like through which there is an axial passage containing a movable rod or shaft that either extends outwardly beyond the nut or has a part connected therewith that does so extend, and wherein it is desirable that an effective seal be provided to prevent water, dust or other substances from passing through or along the nipple. Examples are ships and other water craft which frequently have panels, on one side of which instruments are located; such instruments being supported by nipples passing through the panels to the opposite sides and being there provided with nuts engaging the panels. Where movable control or operating shafts extend through such nipples for direct operation or for the operation by rocking levers or finger pieces, moisture from spray, wash or drip may penetrate into the instruments through the nipples unless means are provided to prevent it. The most common way of guarding against such penetration of moisture has heretofore been to provide sealed enclosures which make it necessary to open doors, covers or the like to gain access to the operating or control shafts or levers.

The object of the present invention is to provide the nuts that are applied to the aforesaid nipples with sealing means to prevent penetration of moisture, dust or other substances from without into the interior of the nipples.

In carrying out the present invention, sealing members of soft rubber or other flexible, elastic material are attached to the nuts so as to embrace and grip the operating or control shafts, levers or the like. A subsidiary object of the present invention may be said to be so to construct the parts that the sealing devices are securely held on the nuts.

In the preferred embodiment of the invention the flexible sealing member for gripping the operating or control element takes the form of a cap, with a hole in the center, that is fitted over the outer end of the nut with said element extending through and expanding the hole in the top of the cap. A further object of the invention is so to shape the parts that a good seal is obtained, not only around said operating or control element, but also around the outside of the nut.

It is usually advisable to provide an effective seal between the under side of a nut on a nipple and a panel or wall through which the nipple passes and with which it is desired that the nut have metal to metal contact. This may conveniently be accomplished by placing on the under side of the nut a sealing ring composed of the same material as the cap. This sealing ring may be a piece separate from the cap or it may be integrally united with the latter. One of the objects of the present invention may therefore be said to provide a nut with a simple means for creating a seal, not only between a nut and an element protruding therefrom but, also, between the nut and a panel or wall against which the nut is pressed in the use thereof.

Figure 2:
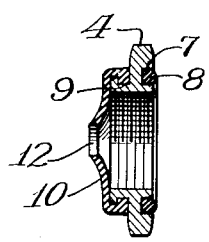
Figure 3:
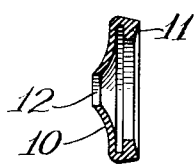
Figure 4:
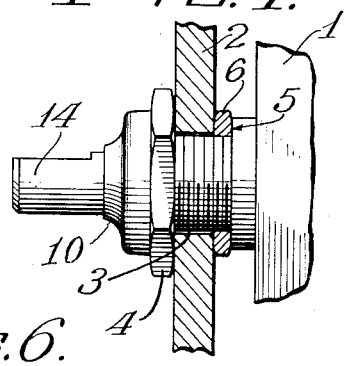
Figure 5:
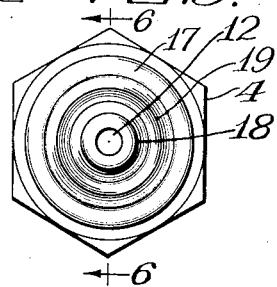
Figure 6:
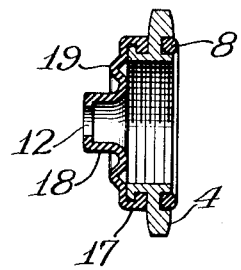
Figure 7:
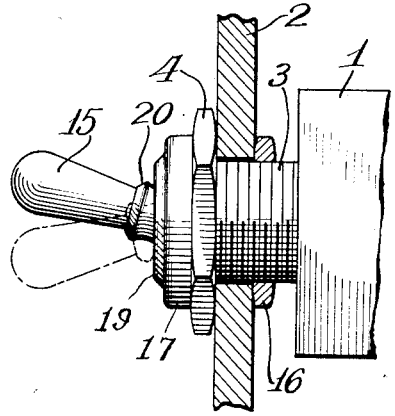
Figure 8:
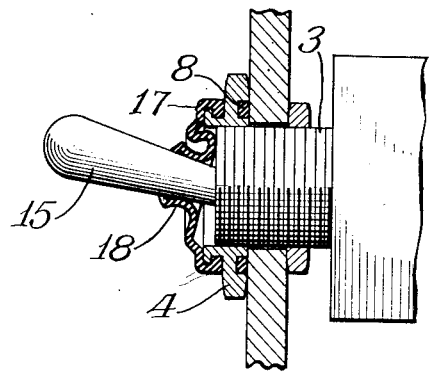

The various features of novelty whereby the present invention is characterized will hereinafter be pointed out with particularity in the appended claims; but for a full understanding of the invention and of its objects and advantages, reference may be had to the following detailed description taken in connection with the accompanying drawing, wherein:

Figure 1 is a top plan view of a nut equipped in accordance with the present invention; Fig. 2 is a section on line 2—2 of Fig. 1; Fig. 3 is a section through the cap on the same plane as Fig. 2, showing the cap as it appears when off the nut; Fig. 4 is a side view of a box, casing or other object attached to a panel, with the attaching means sealed in accordance with the present invention; Fig. 5 is a view similar to Fig. 1, illustrating a modification; Fig. 6 is a section on line 6—6 of Fig. 5; Fig. 7 is a view similar to Fig. 4, embodying the nut of Figs. 5 and 6 applied to a nipple provided with a rockable protruding operating element; Fig. 8 is a view similar to Fig. 7, showing the nut in section; Fig. 9 is a view similar to Fig. 1, illustrating an arrangement wherein the sealing means are permanently connected to the nut; Fig. 10 is a section on line 10—10 of Fig. 9; Fig. 11 is a section, on a larger scale, through the sealing ring on the under side of the nut; Fig. 12 is a top plan view of the nut without the sealing means; and Fig. 13 is a section on line 13—13 of Fig. 12.

Referring to Figs. 1-4 of the drawing, I represents the housing or casing of some instrument or piece of apparatus adapted to be mounted on one side of a wall, represented as being a metal panel 2, so as to have an actuator or controller extending through the wall to the opposite side. Member I has a nipple 3 projecting therefrom and passing through and beyond the wall. On the outer or free end of the nipple is a nut 4 adapted to be screwed tightly against the wall; the casing or the nipple being provided with a shoulder to contact the wall on the side opposite that on which the nut is located. In the particular construction illustrated, there is an external shoulder 5 at the base of the nipple, together with a washer or spacer 6 positioned between the shoulder and the wall. In the under face of the nut is an annular groove 7 surrounding the bore in the nut. In this groove is a ring 8 of rubber or other suitable elastic, compressible material, the diameter of the material from which the ring is made being greater than the depth of the groove; thus making it necessary to compress the material of the ring in making metal to metal contact between the nut and the wall when the nut is tightened, and thereby insuring a seal between the under face of the nut and the wall. The nut has a second groove 9 extending continuously around the same near the outer face in a plane transverse to the axis of the nut.

Fitting over the outer portion or top of the nut is a cap 10 of thin rubber or other flexible, elastic material; the cap having at the rim an internal flange or bead 11 that fits snugly into groove 9. The flange or bead 11 is made smaller in diameter than the groove which it is to enter, as can be seen by comparing Figs. 2 and 3, so that it will tend to contract after being sprung into the groove and so insure a tight joint between the flange and the nut. The top of the cap is not flat, but bulges upwardly or outwardly in a manner to produce a central peak. The tip of this peak is eliminated, however, due to the presence of a central hole 12 in the cap. The diameter of this hole is only about one half that of a rotatable or reciprocable operating or control shaft or stem 14 that is coaxial with and protrudes from the nipple 3. Consequently, when element 14 is inserted in the hole in the cap, the material of the cap around the opening is stretched and grips such element in the manner of a sleeve. This insures a tighter joint than would be the case if the effectiveness of the seal depended upon contact of the edge of the sheet-like material bounding the hole in the cap top with the shaft or stem.

It will thus be seen that no moisture, dust or other substance can pass through the cap along the shaft or stem, nor underneath the cap, along the top face of the nut, to the stem. Therefore, since the sealing ring 8 prevents foreign matter from creeping in to the nipple between the nut and the panel, the contents of the casing 1 are fully protected against the entrance of moisture or other foreign matter which could occur in the absence of the novel sealing means.

It will also be seen that by having the upper half of the nut round and the polygonal lower half considerably larger and forming, in effect a flange thereon, the cap cannot be damaged by a wrench applied to the nut to turn it.

The present invention is effective in creating a seal around a rocking or swinging lever or finger piece as well as around a shaft or stem that simply reciprocates or rotates about its own axis. Figs. 5 to 8 illustrate the modifications desirable in the case of a rockable actuator as, for example, the finger piece of a toggle switch. It may be assumed that the casing 1 is a switch casing, and that 15 is a rockable finger piece protruding from the free end of the nipple. The nipple is shown as having thereon a nut 16 that combines the functions of the shoulder 5 and the spacer in the other form. The nut 4 and the sealing ring 8 are the same as those previously described. Only the cap member requires substantial variation to produce the most satisfactory results. Even the modified cap 17 is, as a whole, about the same as before, being provided with the flange or bead 11 sprung into the groove 9 in the nut. However, the central portion of the top of the cap is in the form of a nipple or an inverted cylindrical cup 18 in the bottom wall of which the hole 12 is located. Also, there is an annular, outwardly protruding corrugation 19 surrounding the cup shaped part. In assembling the parts, the cup shaped element on the cap is stretched in such a manner that the ring-like bottom member is forced outwardly to create a bead 20 on the outside of and at the free end of what has the appearance of a sleeve rising from the top of the cap; such sleeve gripping the finger piece or actuator 15 in much the same way as the other form of cap grips a reciprocating or rotary shaft or stem, except that the grip is more powerful due to stiffening effect of the bead or ridge 20.

The corrugation in the top of the cap gives the top great flexibility, permitting the element 18 to tilt or rock with the finger piece without further deformation of that part thereof that is gripping the finger piece; the grip of the cap on the finger being therefore fully maintained in all angular positions of the finger piece. This capacity of the top wall of the cap to flex as the finger piece rocks may be increased by leaving behind or underneath such wall a free space into which it may move downwardly at one point while rising above its normal position at a diametrically opposite point. Such a free space may be provided by making the part of the nipple protruding from the outer side of the panel shorter than the thickness of the nut, as shown.

Instead of molding the cap and the ring separately and then applying them to a nut, they may be molded in place on the nut and, furthermore, may be in one piece. Such an arrangement is shown in Figs. 9 to 13. In these figures the nut 4a is just like nut 4, except that holes 21 are drilled up through the flange-like portion of the nut along the groove, from the latter to groove 9. The cap 10a and the ring 8a are substantially like the corresponding parts in Figs. 1 to 3, but are joined to each other by little connecting pieces or plugs 22, formed of the same material as the cap and ring and filling holes 21.

The sealing ring may be so shaped that the part which protrudes beyond the under face of the nut is triangular in cross-section, with the base of the triangle parallel with said face.

With this construction, only one mold is needed to make both rubber parts; only nuts equipped with sealing means, and no individual caps or rings, need be kept in stock; and the danger of losing a cap or a ring during handling or shipping is eliminated. On the other hand, when separable caps and rings are used, a cap or ring, when no longer satisfactory, may be replaced without the necessity of discarding the nut itself.

While we have illustrated and described with particularity only a single preferred form of our invention, together with a few slight modifications, we do not desire to be limited to the precise details thus illustrated and described; but intend to cover all forms and arrangements that come within the definitions of our invention constituting the appended claims.

We claim:

1. A seal nut in the under face of which is an annular groove having its center at the axis of the nut, a sealing member in said groove and projecting outwardly therefrom, said member being elastic and compressible into said groove to permit metal to metal contact between the nut and an underlying element whose upper surface is complementary to the under surface of the nut, said nut having also a continuous peripheral groove in a plane transverse to the axis of the nut, and a cap of flexible, elastic material fitted over and covering the outer portion of the nut and provided with a continuous flange sprung into the peripheral groove, the cap having in the center an opening smaller in area than the cross-sectional area of a movable actuator adapted to extend through the same from an element upon which the nut is to be screwed.

2. A nut as set forth in claim 1, in which the the nut is provided with holes that extend inwardly from the groove in the under face and in which elements integral with both the said sealing member in that groove and the cap are contained in said holes.

3. The combination with a panel, a housing on one side of the panel provided with a screw-threaded nipple projecting through the panel, a nut on the free end of the nipple, and a rockable actuator protruding from said end of the nipple outwardly beyond the nut: of sealing means between the under side of the nut and the panel, and a flexible, elastic cap perforated for the passage of said actuator therethrough fitted over and covering the outer portion of the nut and containing an annular corrugation surrounding the actuator, said corrugation being smaller than the diameter of the bore in the nut, whereby the portion of the corrugation directly underlying the actuator may be depressed into the bore whenever the actuator is rocked into a predetermined position provided that the nipple extends only part way through the nut.

4. In combination, a nut having at one end a part of substantially smaller diameter than the remainder thereof and having holes extending through the same beside said part of smaller diameter, a cap of flexible, elastic material fitted over the latter part of the nut and having a small opening in the center, and anchoring elements for said cap extending up through said holes.

5. In combination, a nut having at one end a part smaller in diameter than the remainder and having in the side at the opposite end an annular groove with its center at the axis of the nut, there being holes extending from within the groove up through the nut beside the part of reduced diameter; and a molded member of flexible, elastic material comprising a perforated cap fitted over the part of the nut of smaller diameter, a ring in said groove, and connecting pieces between the cap and the ring extending through said holes.

JOHN E. JOHANSON.
WILLIAM A. YONKERS.

REFERENCES CITED

The following references are of record in the file of this patent:

UNITED STATES PATENTS

| Number | Name | Date |
| --- | --- | --- |
| 255,914 | Bergen | Apr. 4, 1882 |
| 488,587 | Tilden | Dec. 27, 1892 |
| 1,254,514 | Lehmann | Jan. 22, 1918 |
| 2,107,090 | Sevennes | Feb. 1, 1938 |
| 2,265,496 | Shaw | Dec. 9, 1941 |
| 2,283,139 | Herget | May 12, 1942 |
| 2,334,548 | Greenlee | Nov. 16, 1943 |
| 2,362,456 | Alden | Nov. 14, 1944 |
| 2,440,943 | Gonsett et al. | May 4, 1948 |